March 2, 1937.  F. F. PLACK  2,072,823
HANDLE CONNECTION
Filed June 3, 1936  2 Sheets-Sheet 1
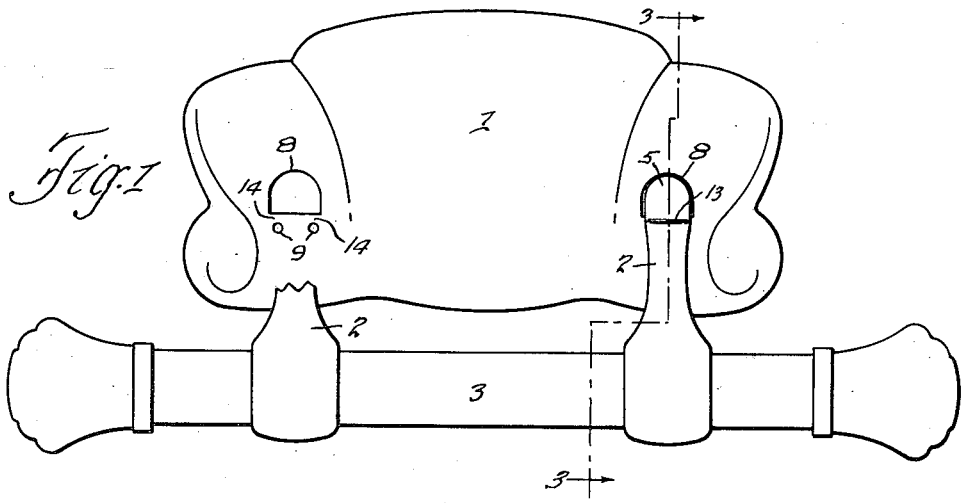
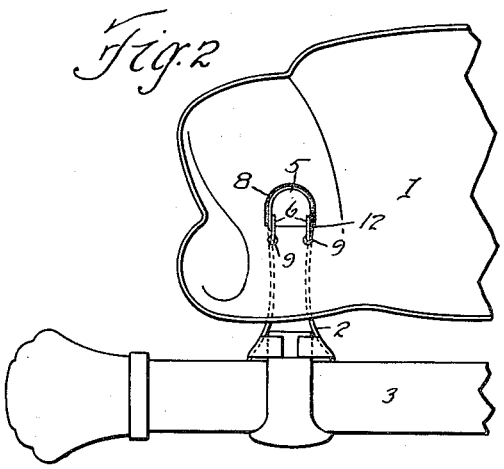
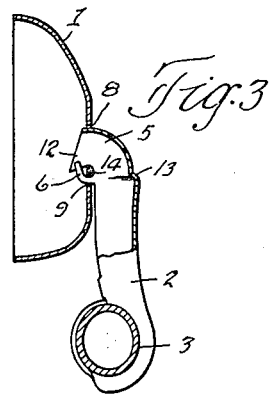
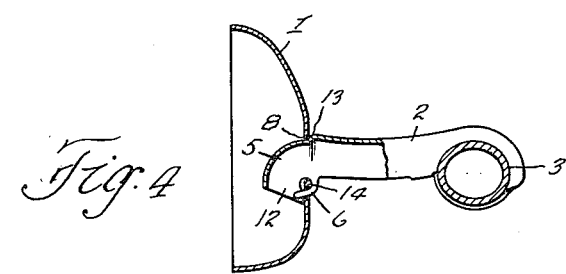
INVENTOR.
Frank F. Plack
BY Hull, Brock & West
ATTORNEYS March 2, 1937.                F. F. PLACK                2,072,823
                          HANDLE CONNECTION
               Filed June 3, 1936              2 Sheets-Sheet 2
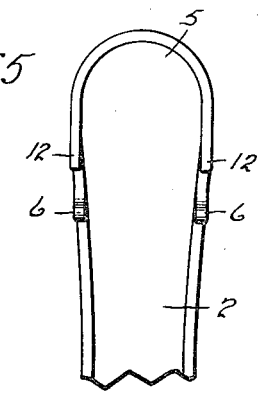
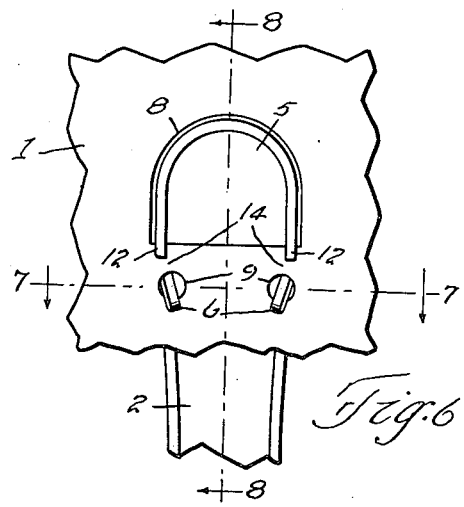
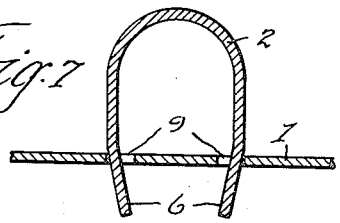
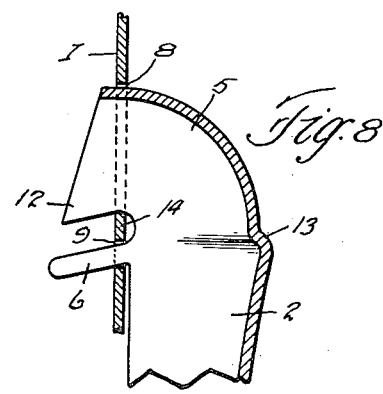
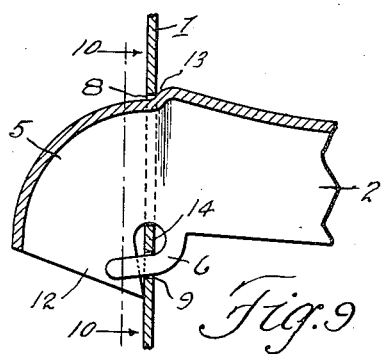
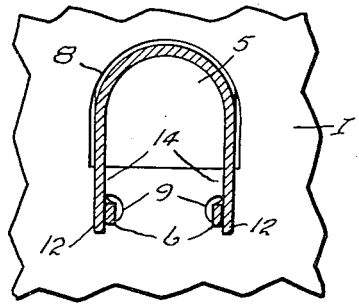
INVENTOR.
Frank F. Plack
BY Hull Brock West
ATTORNEYS Patented Mar. 2, 1937

2,072,823

UNITED STATES PATENT OFFICE 2,072,823

HANDLE CONNECTION

Frank F. Plack, Cleveland, Ohio, assignor to The Dickey-Grabler Company, Cleveland, Ohio, a corporation of Ohio Application June 3, 1936, Serial No. 83,278

4 Claims. (Cl. 16—112)

This invention relates to an improved handle that is especially suited for use with burial cases or caskets, the same being of the sheet metal variety and of the type in which the pivotal connection between each of the handle bar supporting arms and a mounting plate is made complete, without additional means or the use of any tool, when such arm, in a downward position, is interengaged with the cooperating parts of the mounting plate and initially swung upwardly in the same way as in the lifting of an object to which the handle is attached.

The aims of the invention are to provide an attractive handle of the above type that is strong, simple of construction, and cheap; that is especially convenient of assembly; that is smooth of action, and that operates quietly when raised and is free from metallic sound when released and dropped, a feature highly desirable in sheet metal handles for caskets, as will be readily appreciated.

The foregoing objects and advantages are attained in the embodiment of the invention illustrated in the accompanying drawings wherein Fig. 1 is an elevational view of a burial case handle incorporating my improvements, the upper end of one of the handle bar supporting arms being broken away to reveal the openings in the mounting plate wherewith the pivoted end of said arm cooperates; Fig. 2 is a fragmentary view of the handle showing it as though looking from the inner side of the mounting plate; Fig. 3 is a section on the line 3—3 of Fig. 1; Fig. 4 is a sectional detail, similar to Fig. 3, showing the handle bar raised as in the lifting of an object to which the handle is attached; Fig. 5 is an enlarged inside view of the upper end of the handle bar supporting arm before it is attached to the supporting plate; Fig. 6, which, with the following views, is on the same scale as Fig. 5, shows a fragment of the supporting plate as viewed from the inner side thereof with the elbow and fingers of the arm projected through the respective openings provided therefor in said supporting plate; Figs. 7 and 8 are sectional details on the respective lines 7—7 and 8—8 of Fig. 6, the foregoing series of enlarged views showing the arm before it is initially lifted to pivotally connect it to the supporting plate; Fig. 9 is a sectional detail, similar to Fig. 8, showing the arm lifted so as to bend the fingers and dispose their ends inside and in overlapping relation to the adjacent edges of the elbow of the arm thereby to pivotally connect the arm to the supporting plate, and Fig. 10 is a sectional detail on the correspondingly numbered line of Fig. 9.

The handle wherein I have shown my improvements incorporated includes a supporting plate or base 1, arms 2 that are pivotally connected to said plate or base, and a handle bar 3 that is suitably fastened to the free ends of said arms. My invention resides in the connection between each of the arms and the supporting plate or base, and it might be well to explain at this point that a very common alternative of the style of handle here shown is one in which an individual mounting plate or so-called "lug" is associated with each arm.

The mounting plate 1 and each of the arms 2 are desirably formed from sheet metal, the portion of the arm adjacent the mounting plate being of channel formation and having its upper end extended laterally in the direction of its open side to form an elbow 5. Fingers 6 project from the inner side of the arm in spaced relation to the lower edges of the elbow and their ends are shown as rounded. It will be observed that the sides of each arm, as the same is viewed in Fig. 1, for example, are curved inwardly slightly, this being for the purpose of imparting a more graceful appearance to the arm. This also has the effect of setting the fingers somewhat closer together than the adjacent corners of the elbow, as will appear from Fig. 5.

A generally semi-circular opening 8, and two apertures 9, shown as circular, are formed, preferably by punching, in the mounting plate 1 for the reception, respectively, of the elbow 5 and the fingers 6 of each of the arms 2. It will be observed that the apertures 9 are inside the vertical planes of the side of the opening 8, so that when the elbow 5 of the arm 2 is projected through the opening 8 and the fingers 6 through the apertures 9, the latter will be practically concealed by the arm when the same hangs down in the position shown in Figs. 1, 2 and 6. The rounded ends of the fingers 6 facilitate their insertion into the circular apertures 9, and inasmuch as the vertical dimension of the fingers is only slightly less than the diameter of said apertures, the curved outer edges of the apertures will serve to cam the fingers inwardly slightly as they are inserted through the openings, as best shown in Figs. 6 and 7. Now when the arm is first swung upwardly to the position shown in Figs. 4 and 9, the lower edges of the fingers 6 will ride down the inclined outer and lower edges of the apertures 9 until they reach substantially the transverse center of the apertures and during the continued upward movement of the arm the fingers will be bent edgewise and have their ends disposed inwardly and in substantial overlapping relation to the adjacent edge portion of the elbow 5, as shown in Figs. 2 and 10, thereby to wrap said fingers, so to speak, about the pivotal portions 14 that are between the lower edge of the opening 8 and the apertures 9. The upward swinging movement of the arm is limited by the engagement of the terminal portions 12 of the sides of the elbow 5 with the inner side of the supporting plate below the opening 8 and by the engagement of a shoulder 13 of the arm with the outer side of the plate above said opening.

By reason of the way in which the fingers 6 are wrapped around the pivotal portions 14, as above explained, a smooth and almost circular opening is formed about said pivotal portions so that the swinging movement of the arm will be free and easy, yet there will be insufficient lost motion between the parts to result in noticeable rattling. Also, when the handle is released, the convergent portions of the opposed fingers 6 adjacent their junction with the arm will cooperate with the outer edges of the apertures 9 in such manner as to retard the downward swinging of the arm and cause it to gently come to rest without striking the adjacent portion of the supporting plate and causing an undesirable metallic sound.

Obviously the apertures 9 might be other than round, so long as their lower, outer edges are inclined downwardly and inwardly to serve as cams for action on the fingers 6 in the manner above described.

Having thus described my invention, what I claim is:

1. In a handle, the combination of an arm which, adjacent its upper end, is of channel formation and is extended laterally in the direction of its open side to form an elbow, the arm having fingers projecting from its edge below and in spaced relation to the underneath edges of the elbow, and a base having an opening in which the elbow is inserted and on whose lower edge the elbow fulcrums when the outer end of the arm is swung upwardly, the base having also an aperture below said opening in which each of said fingers is inserted, the outer edge of the aperture being inclined downwardly and inwardly to serve as a cam that deflects the finger inwardly and then bends it edgewise when the arm is first swung as aforesaid thereby to dispose the end of the finger inside and in substantial overlapping relation to the adjacent edge of the elbow.

2. In a handle, the combination of an arm which, adjacent its upper end, is of channel formation and is extended laterally in the direction of its open side to form an elbow, the arm having fingers projecting from its edge below and in spaced relation to the underneath edges of the elbow, and a base having an opening in which the elbow is inserted and on whose lower edge the elbow fulcrums when the outer end of the arm is swung upwardly, the base having also two apertures whose entire areas lie between the vertical planes of the lateral sides of said opening and in which the aforesaid fingers are inserted, the outer edges of the apertures being inclined downwardly and inwardly with respect to the aforesaid planes and serving as cams to deflect the fingers inwardly and then bend them edgewise when the arm is first swung as aforesaid thereby to dispose the ends of the fingers inside and in substantial overlapping relation to the adjacent edges of the elbow.

3. In a handle, the combination of an arm which, adjacent its upper end, is of channel formation and is extended laterally in the direction of its open side to form an elbow, the arm having fingers projecting from its edges below and in spaced relation to the underneath edges of the elbow, the ends of the fingers being convergent, and a base having an opening in which the elbow is inserted and on whose lower edge the elbow fulcrums when the outer end of the arm is swung upwardly, the base having also two round apertures whose entire areas lie between the vertical planes of the lateral sides of said opening and in which the aforesaid fingers are inserted, the lower and outer portions of the edges of said apertures serving as cams to deflect the fingers inwardly and then bend them edgewise when the arm is first swung as aforesaid so as to dispose the ends of the fingers inside and in substantial overlapping relation to the adjacent edges of the elbow.

4. In a handle, the combination of an arm which, adjacent its upper end, is of channel formation and is extended laterally in the direction of its open side to form an elbow, the lower edges of the elbow being in acute angular relation to the edges of the arm therebelow, the arm having fingers projecting from its edges beneath and in spaced and substantially parallel relation to the underneath edges of the elbow, the ends of the fingers being convergent, and a base having an opening in which the elbow is inserted and on whose lower edge the elbow fulcrums when the outer end of the arm is swung upwardly, the base having also two apertures whose entire areas lie between the vertical planes of the lateral sides of said opening and in which the aforesaid fingers are inserted, the outer edges of said apertures being inclined inwardly and downwardly and serving as cams to deflect the fingers toward each other and then bend them edgewise when the arm is first swung as aforesaid so as to dispose the ends of the fingers inside and in substantial overlapping relation to the adjacent edges of the elbow.

FRANK F. PLACK.